United States Patent
Ross-Messemer (10) Patent No.: US 8,519,849 B2
(45) Date of Patent: Aug. 27, 2013

(54) RFID-TRANSPONDER AND DEVICE HAVING AN RFID-TRANSPONDER AS WELL AS A METHOD OF MAKING AN ANTENNA FOR AN RFID-TRANSPONDER

(75) Inventor: Martin Ross-Messemer, Essingen (DE)

(73) Assignee: Carl Zeiss Vision GmbH, Aalen (DE)

( * ) Notice: Subject to any disclaimer, the term of this patent is extended or adjusted under 35 U.S.C. 154(b) by 429 days.

(21) Appl. No.: 12/318,875

(22) Filed: Jan. 12, 2009

(65) Prior Publication Data
US 2009/0212953 A1    Aug. 27, 2009

Related U.S. Application Data

(63) Continuation of application No. PCT/EP2007/003711, filed on Apr. 27, 2007.

(30) Foreign Application Priority Data

Jul. 11, 2006  (DE) .......................... 10 2006 031 968

(51) Int. Cl.
*G08B 13/14*    (2006.01)
(52) U.S. Cl.
USPC ................................... 340/572.7; 340/572.1
(58) Field of Classification Search
USPC .......... 340/572.1, 572.5, 572.7, 572.8, 572.9, 340/571, 539.1, 539.11, 573.1, 573.11, 10.1; 235/491, 492, 375, 380, 487; 252/500, 511, 252/512; 438/795; 349/152, 204–206
See application file for complete search history.

(56) References Cited

U.S. PATENT DOCUMENTS

| 5,621,571 | A | 4/1997 | Bantli et al. |
| 6,121,880 | A | 9/2000 | Scott et al. |
| 6,275,157 | B1 | 8/2001 | Mays et al. |
| 6,525,660 | B1 * | 2/2003 | Surintrspanont ........... 340/572.1 |
| 7,272,502 | B2 | 9/2007 | Lee et al. |
| 7,306,158 | B2 * | 12/2007 | Berardi et al. ................. 235/492 |
| 7,468,774 | B2 * | 12/2008 | Sakama et al. ................. 349/152 |
| 7,510,985 | B1 * | 3/2009 | Boenke et al. ................. 438/795 |
| 7,557,890 | B2 * | 7/2009 | Sakama et al. ................. 349/152 |

(Continued)

FOREIGN PATENT DOCUMENTS

| DE | 196 13 491 | 10/1997 |
| EP | 1 280 224 A1 | 1/2003 |

(Continued)

OTHER PUBLICATIONS

English translation of the Office action of the German Patent Office dated May 11, 2007 in German patent application 10 2006 031 968.0 on which the claim of priority is based.

(Continued)

*Primary Examiner* — Van T. Trieu
(74) *Attorney, Agent, or Firm* — Walter Ottesen P.A.

(57) ABSTRACT

The invention relates to an RFID-transponder, an optical element (150) with an RFID-transponder and an antenna (110) for an RFID-transponder. According to the invention, the antenna (110) is constructed to be optically transparent. The invention additionally relates to a method for producing an antenna (110) for an RFID-transponder. The inventive method for producing an antenna (110) of an RFID-transponder is characterized by the following method steps: a) providing an object (150) having a surface to be equipped with the RFID-transponder, b) application of a transparent conductive coating to the surface, c) lithographic structuring of the transparent conductive coating in order to form the antenna (110).

13 Claims, 4 Drawing Sheets

(56) References Cited

U.S. PATENT DOCUMENTS

| | | | |
|---|---|---|---|
| 7,642,918 B2 * | 1/2010 | Kippelen et al. | 340/572.8 |
| 7,651,032 B2 * | 1/2010 | Shanton | 235/491 |
| 7,793,848 B2 * | 9/2010 | Abe et al. | 235/492 |
| 7,843,341 B2 * | 11/2010 | Phaneuf et al. | 340/572.1 |
| 2005/0040242 A1 * | 2/2005 | Beenau et al. | 235/492 |
| 2005/0236603 A1 * | 10/2005 | Faris | 252/500 |
| 2006/0033874 A1 | 2/2006 | Sakama et al. | |

FOREIGN PATENT DOCUMENTS

| | | |
|---|---|---|
| JP | 2002-329177 A | 11/2002 |
| JP | 2003-267527 A | 9/2003 |
| JP | 2004-175509 A | 6/2004 |
| WO | WO 03/018253 A1 | 3/2003 |

OTHER PUBLICATIONS

English translation of the Office action of the European Patent Office dated Jun. 2, 2009 in parallel European patent application 07 724 641.1-1248.

English translation of Written Opinion of the International Searching Authority dated Jan. 17, 2008 in international patent application PCT/EP2007/003711 on which the claim of priority is based.

* cited by examiner

RFID-TRANSPONDER AND DEVICE HAVING AN RFID-TRANSPONDER AS WELL AS A METHOD OF MAKING AN ANTENNA FOR AN RFID-TRANSPONDER

CROSS REFERENCE TO RELATED APPLICATIONS

This application is a continuation application of international patent application PCT/EP 2007/003711, filed Apr. 27, 2007, designating the United States and claiming priority from German application 10 2006 031 968.0, filed Jul. 11, 2006, and the entire content of both applications is incorporated herein by reference.

BACKGROUND OF THE INVENTION

RFID or radio frequency identification is a term characterizing a technology for the contactless transmission of identification features. An RFID-system comprises a transmission/receiver unit and an RFID-transponder. The transmission/receiving unit (RFID-reading device, RFID-terminal) can read out data stored in the RFID-transponder (also referred to as RFID-label or RFID-tag).

RFID-transponders exist in a great many configurations. The best known are RFID-transponders in the form of labels for attaching with adhesive or labels which are sewn in. In addition, there are RFID-transponders in the form of blocks or glass capsules for injections. RFID-transponders include a microchip having a memory and an antenna. RFID-transponders can be realized as active or passive. The antenna comprises, for example, a copper foil and can be especially well recognized in RFID-labels.

One distinguishes between active and passive RFID-transponders. Active labels have their own energy supply. Passive labels obtain their energy only from the electromagnetic field of the reading apparatus.

Data can be read out from an RFID-transponder via an RFID-reading apparatus. The read out function is contactless. Typical RFID solutions bridge distances of some centimeters up to several meters. The possible reading distance is dependent above all on the transmitting power of the RFID-terminal (reading apparatus) and the antennas used.

There is no uniform RFID standard which stipulates a specific frequency band. The frequency bands, which are available for use, differ from one country to another. Thus, different national and international solutions have developed. The following frequency ranges are distinguished:

a) 30 to 500 kHz (LF): in this range, cost effective systems are realized, for example, for access controls and controls to prevent unauthorized use in motor vehicles. Many solutions for time detection and access control operate at 125 kHz. The reading speed is relatively low.

b) 10 to 15 MHz (HF): solutions for identification in retail dealerships operate in this range. The label known as the smart label comprises an RFID-transponder and a barcode and operates at 13.56 MHz.

c) 850 to 950 MHz (UHF): in Europe, the range of 868 MHz to 870 MHz is authorized for RFID applications. The region about 915 MHz is not permissible in Europe as an ISM-band. In the United States and Australia, this band is, however, used for RFID. Some solutions in the area of logistics operate in the UHF range.

d) 2.4 to 2.5 GHz and 5.8 GHz (microwaves): in these ranges, so far hardly any practical solutions are present. In the free released bands, also wireless LAN-systems (WLAN) operate according to IEEE 802.11.

There are RFID-systems which operate with only one carrier frequency. So-called agile readers are reading apparatus which can operate at several frequencies.

The use of copper antennas is often not practical when the external appearance of the item equipped with an RFID-transponder is important such as a piece of jewelry or when the item, which has the RFID-transponder, itself has an optical function such as the glass of a watch or the mirrored surface of an optical apparatus.

In the meantime, the Swiss firm Winwatch offers wristwatches which are equipped with an RFID-transponder in order to, for example, carry out a payment without cash. This is possible via an RFID-chip of the Hitachi Company built into the watch glass. This so-called µ-chip is a complete RFID-transponder having memory for a serial number including 128 bits. What is decisive here is the size. The chip has an edge length of only 0.4 mm whereby it can be applied almost invisibly over the indicator aim axis of the watch. Building into the glass of the watch affords two advantages. The RFID-chip can, on the one hand, be built into every watch glass without it being necessary to change the inner workings of the watch. The glass can be manufactured with the RFID-chip and built in and, if necessary, also be retrofitted. On the other hand, the seating in the watch glass prevents the RFID-signal from being disrupted or attenuated by the metal housing. Notwithstanding the tiny dimensions, the chip has a complete antenna in the same manner as the larger versions thereof. The size, however, prevents the chip from being read out at far distances. For this purpose, the transmission power is not adequate. Furthermore, the visibility of the RFID-chip in the watch glass is found to be disturbing by users with this visibility being present notwithstanding the small dimensions of the RFID-chip.

SUMMARY OF THE INVENTION

In view of the foregoing, it is an object of the invention to provide an RFID-transponder which can also be applied to items for which the optical appearance and/or the optical function is important and which, if needed, can also be designed for transmitting powers higher than the above-described RFID-chip. It is another object of the invention to provide a method for making an antenna of an RFID-transponder of the kind described above.

The RFID-transponder of the invention includes an antenna configured to be optically transparent.

The method of the invention is for making an antenna for an RFID-transponder including the steps of: providing an item to be provided with the RFID-transponder and the item having a surface; applying a transparent, conductive coating to the surface; and, lithographically structuring the transparent, conductive coating to the shape of the antenna.

The essential concept of the invention comprises configuring the RFID-transponder optically transparent in the decisive spectral range as far as possible. It can be easily seen that not all components of the RFID-transponder can be configured so as to be optically transparent. Accordingly, especially the microchip and the memory of an RFID-transponder are, as a rule, based on silicon technology which cannot be replaced by other materials in the foreseeable future. These components can, however, be configured to be very small and, furthermore, can be applied at almost any location of an item provided with a transponder without the function of the RFID-transponder as a whole being affected. On the one hand, the location of the antenna is critical for the functionality of the RFID-transponder. This antenna may not be applied in the vicinity of electrically conductive components of the item in question. Furthermore, the size of the antenna is also decisive for the range of the transponder. Both reasons lead to the situation that the antenna of an RFID-transponder (especially for items having similar dimensions as the antenna of the RFID-transponder to be applied) need be applied to a location whereat they are perceived by the user as being disturbing. This is so because the antenna decisively determines the aesthetic appearance of the item (for example, a piece of jewelry or a watch) or affects where the optical function of the item (for example, the lenses of spectacles or the lens of a magnifier).

For the above reasons, the invention provides that the antenna is configured to be transparent at least in the decisive spectral range. As a rule, optical transparence is understood to be a transmissibility for visible light. It is, however, noted that the present invention also includes cases wherein the transmissibility, for example, in the infrared spectral range or a part of the infrared spectral range or even the ultraviolet spectral range or a part of the ultraviolet spectral range, is required and, for example, a simultaneous transmissibility for the visible light need not be available or only over a specific part or to a specific degree (for example, 30% transmissibility). The size of the antenna can then be so selected that the RFID-transponder has the desired range (if not in conflict with other boundary conditions).

Voluminous antenna bodies which are transparent and at the same time electrically conductive are, on the one hand, difficult to manufacture and, on the other hand, such antenna bodies are comparatively heavy. Preferably, the antenna therefore includes a transparent and electrically-conductive coating or comprises a transparent and electrically-conductive coating. This coating can be a component of the item wherein the optical appearance and/or the optical function or characteristic is important. Optical characteristics are especially the absorption capacity and/or the transparency and/or the reflection capacity and/or the refracting behavior and/or diffracting behavior of an incident ray in a specific spectral range. An item having an optical function or characteristic is, for example, a magnifier, a camera objective, an object carrier or a so-called head mounted display (HMD).

Preferably, the coating is capable of being applied lithographically. Lithographic capability is understood to be the application of methods which permit the application of structured surfaces on a substrate which structural surfaces are electrically conducting. This technology is, for example, used in the production of liquid crystal flat screens (LCD).

An antenna of an RFID-transponder can then be manufactured easily with the following method steps:

(a) providing an item having a surface with the item to be provided with an RFID-transponder;

(b) applying a transparent conductive coating to the surface; and, (c) lithographically structuring the transparent conductive coating to the configuration of the antenna.

The coating preferably comprises an insulator or semiconductor which is electrically conductive because of its doping. Such coatings can be applied to the corresponding item with the aid of conventional deposition methods such as vacuum vaporization, chemical gas phase deposition or cathode ionization.

Transparent conductive oxides are especially suitable as coating materials. These oxides are so-called TCOs (transparent conductive oxides) such as tin oxide doped with fluorine or antimony (SnO:F, abbreviated FTO; SnO:Sb, abbreviated ATO) and/or indium tin oxide ($In_2O_3$:Sn, abbreviated ITO) and/or aluminum doped zinc oxide (ZnO:Al, abbreviated AZO) and/or cadmium stannate ($Cd_2SnO_4$, $Cd_2SnO_3$, abbreviated CTO) and/or cadmium oxide (CdO) and/or cadmium indium oxide ($CdInO_2$) and/or ($CuAlO_2$) and/or silver antimony oxide ($AgSbO_3$).

The surface to be coated can, for example, be a component of a plane-parallel glass plate, a lens or a mirror.

BRIEF DESCRIPTION OF THE DRAWINGS

The invention will now be described with reference to the drawings wherein:

FIGS. 6a to 6d show spectacles wherein the spectacle lenses are equipped with an RFID-transponder in accordance with the invention.

FIG. 7a is a front plan view of the reflection surface of the ST-HMD of FIG. 7; and, FIG. 8 is a schematic of a so-called ST-HMD having an RFID-transponder in accordance with the invention.

DESCRIPTION OF THE PREFERRED EMBODIMENTS OF THE INVENTION

Figure 1:
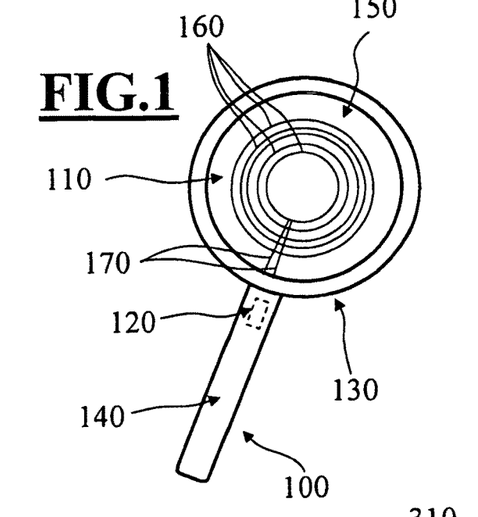
FIG. 1 is a plan view of a magnifier having a passive RFID-transponder according to the invention.

FIG. 1 shows in plan view a magnifier 100 having a passive RFID-transponder according to the invention. The magnifier is configured in the usual manner and includes a handle 140, a frame 130, which is arranged on one end of the handle 140, and a lens 150, which is held by the circular frame 130. The lens 150 likewise has a circular outer contour.

According to the invention, an RFID-transponder is provided which includes a microchip 120 having a memory and an antenna 110. The antenna 110 is configured as an antenna coil having four circular electrically conducting turns 160 which are connected via electrically-conductive connecting leads 170 to the microchip 120. The antenna 110 as such (that is, here the turns 160 of the antenna coil) is configured to be optically transparent so that the user of the magnifier 100 does not see the antenna. Even the connecting leads 170 are here configured to be transparent for visible light. The turns 160 shown in FIG. 1 and the connecting leads 170 therefore indicate only their location but not the view of the observer.

Turns 160 and connecting leads 170 are applied in the form of a coating to the lens 150 and are lithographically structured. As a coating material, especially ITO is suitable which is a material that is used, for example, for electrically contacting liquid crystal displays on the viewing side. In this way, the coil, which is characteristic for RFID, is integrated into an optical surface without affecting its function.

Figure 2:
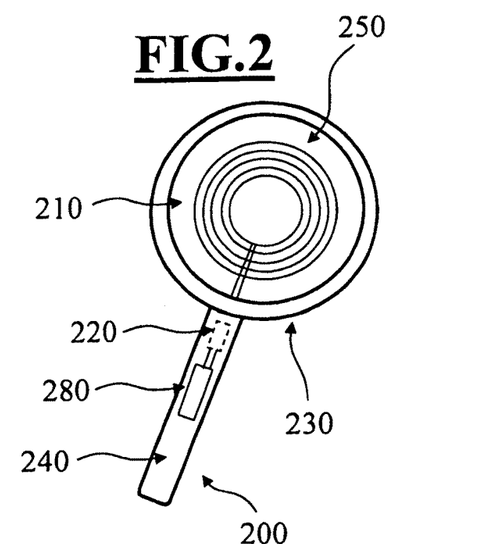
FIG. 2 is a plan view of a magnifier having an active RFID-transponder in accordance with the invention.

FIG. 2 shows a further example of an RFID-transponder of the invention integrated into a magnifier 200. The essential components of the magnifier 200, namely, handle 240, frame 230 and lens 250 are identified with the aid of reference numerals. The transponder is substantially identical to that of the previous embodiment. The transponder includes a microchip 220 having a memory as well as an antenna 210 which is connected to the chip. The antenna is in the form of a coil having four turns arranged concentrically to each other and two connecting leads. As in the above embodiment, the microchip 220 is integrated into the handle 240 of the magnifier 200. This embodiment departs from that of FIG. 1 in that it has its own energy supply in the form of a battery 280 or a rechargeable battery. This battery 280 is likewise integrated into the handle 240 of the magnifier 200. This is therefore an active RFID-transponder.

Figure 3:
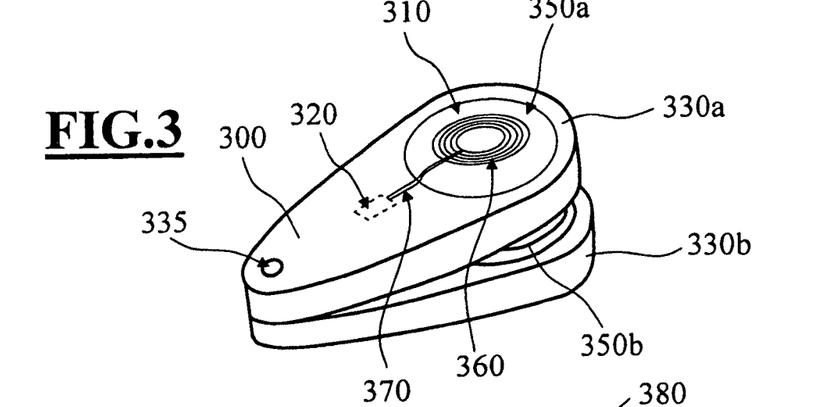
FIG. 3 is a perspective view of a further magnifier having a passive RFID-transponder according to the invention.
Figure 3A:
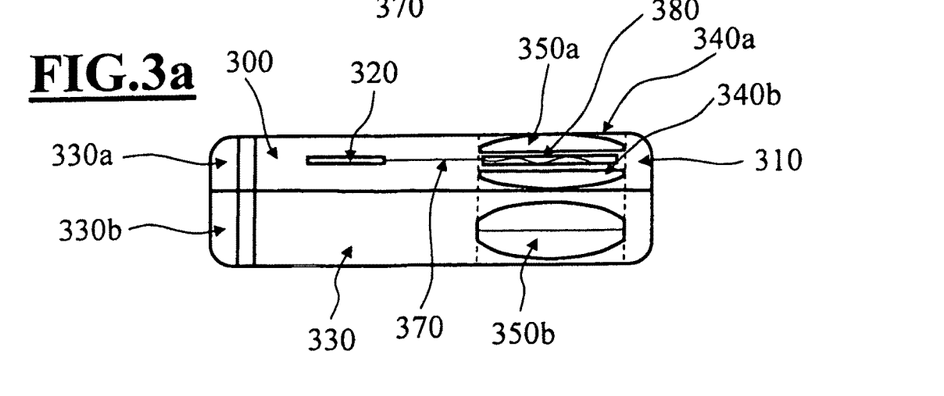
FIG. 3a is a longitudinal axial section view of the magnifier of FIG. 3.

FIGS. 3 and 3a show a further embodiment of a magnifier 300 having an integrated RFID-transponder according to the invention. The magnifier 300 includes a housing 330 comprising two housing parts (330a, 330b). The two housing parts (330a, 330b) are brought together by a connecting element 335 in different but definite positions to each other. The housing parts (330a, 330b) function as a frame for lenses (350a, 350b), respectively. The lens 350a comprises two half-shell-like component lenses (340a, 340b) whose planar surfaces are arranged to face toward each other but at a distance to each other.

An RFID-transponder of the invention is integrated into the upper housing half 330a. The RFID-transponder, which is configured in accordance with the invention, includes a microchip 320 having a corresponding memory and an antenna 310. The antenna 310 is configured here with four circular electrically-conductive turns 360 arranged concentrically to each other. The turns 360 are connected to the microchip 320 via two electrically-conductive connecting leads 370. The antenna 310 is arranged between the two half-shell-shaped component lenses (340a, 340b) and is held by the upper housing part 330a so as not to separate therefrom. The upper housing part 330a holds both component lenses (340a, 340b).

The antenna 310, that is, here the turns 360 of the antenna coil, is optically transparent and configured so as to be invisible to a viewer. The connecting leads 370 are configured so as to be transparent for visible light at least in the region of the lens 350a. The turns 360 of the antenna coil as well as the connecting leads 370, which are arranged in the region of the lens 350a, are applied to a plane-parallel transparent plate 380 which is preferably a glass plate or a plastic plate. The plane-parallel transparent plate 380 functions as a carrier. Here too, the turns 360 and the connecting leads are comprised of a thin transparent electrically-conductive oxide layer of 0.5 μm up to several micrometers layer thickness.

Figure 4:
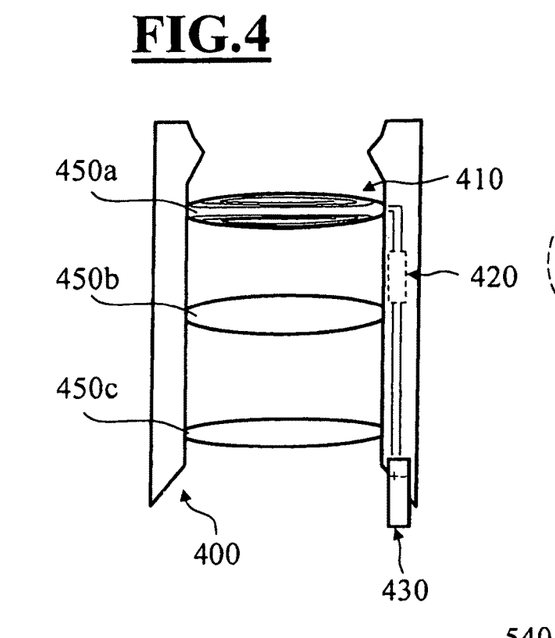
FIG. 4 is a schematic showing the essential components of a camera objective having an RFID-transponder in accordance with the invention.
Figure 4A:
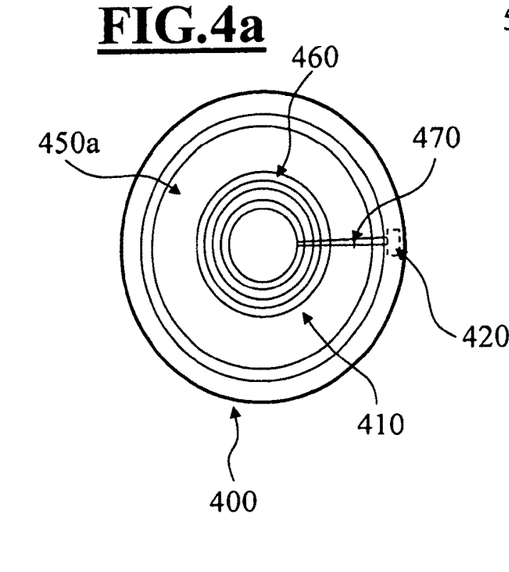
FIG. 4a is a plan view of the camera objective of FIG. 4.

A further embodiment for an optical item to which an RFID-transponder according to the invention can be applied is shown in FIGS. 4 and 4a, namely, a camera objective. In the present embodiment, the objective includes three lenses (450a, 450b, 450c) which are mounted in a housing 400 in spaced relationship to each other. As in the first two embodiments, a TCO-layer (for example, ZnO:Al) is applied in the form of four ring-shaped conductor paths arranged concentrically with respect to each other. The TCO-layer forms an antenna 410. These conductor paths are connected via connecting leads 470 to a microchip 420 having a memory. The microchip 420 is supplied with electrical energy from a battery 430.

Figure 5:
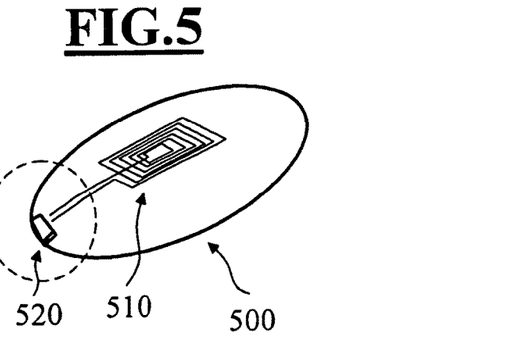
FIG. 5 is a perspective view of an optical lens equipped with an antenna of an RFID-transponder in accordance with the invention.
Figure 5A:
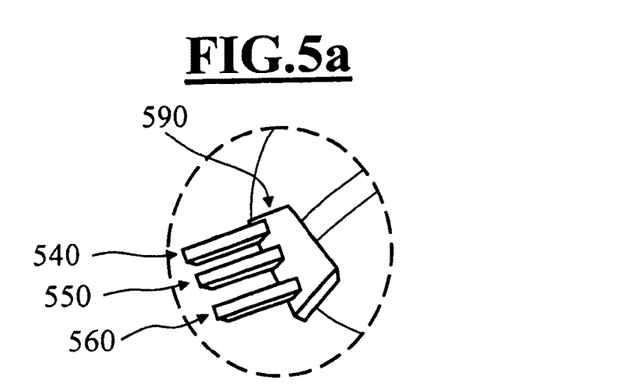
FIG. 5a is a detail view of the electric connecting pins of the antenna of FIG. 5.
Figure 5B:
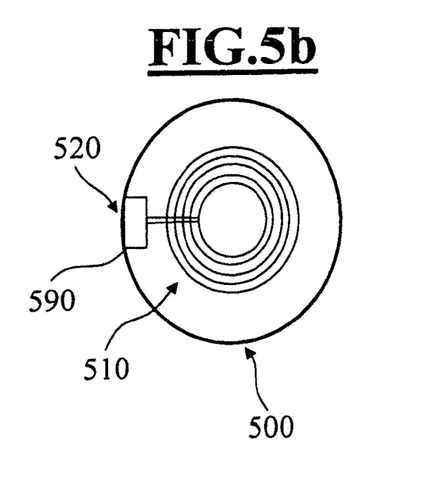
FIG. 5b is a plan view of an alternate version of the antenna of FIG. 5.

A fifth embodiment of an item equipped with an RFID-tag according to the invention is shown in FIGS. 5 and 5a. FIG. 5b shows a slightly modified variation. The first variation is an optical lens 500 on which an RFID-antenna 510 is applied in the center thereof. The RFID-antenna 510 comprises a coil having several concentrically arranged turns in essentially quadratic cross section. The ends of the turns are guided to the lens edge via electrically-conductive connecting leads. Turns and connecting leads are configured to be transparent and are in the form of structured TCO thin layers. Cross-over locations of transparent turns can be produced in that first a TCO-layer is applied and in the region of the crossing conductors, a thin non-conductive intermediate layer-is. applied over which, in turn, a further TCO-layer is then applied. The intermediate layer can, for example, be silicon oxide ($SiO_2$). This intermediate layer can, for example, be vapor deposited, sputtered on or applied with the aid of other vacuum coating processes or non-vacuum coating processes.

An RFID-chip 520 is located in a cutout 590 at the lens edge. The RFID-chip 520 is connected via connecting leads to the RFID-antenna 510. The RFID-chip includes three connecting contacts. (540, 550, 560) or so-called pins, namely, a transmitting pin 540, a receiving pin 550 and a ground pin 560. The broadband transmission of a signal takes place via the transmitting pin 540 at a first transmitting frequency. The receiving pin 550 makes possible the reception at another receiving frequency.

In the alternate variation corresponding to FIG. 5b, the antenna 510 is formed by a winding of concentric ring-shaped turns as in the above-described embodiments. The edge cutout 590 in the lens 500 is clearly shown in FIG. 5b. The edge cutout 590 accommodates the RFID-chip 520.

FIGS. 6a to 6d show RFID-transponders according to the invention having transparent antennas (610, 630) in both lenses (600a, 650a; 600b, 650b; 600c, 650c; 600d, 650d) of spectacles, that is, the antennas are introduced into the lenses of spectacles. Each transparently-configured antenna (610, 630) is connected via corresponding connecting leads (not shown) or via bond balls to an RFID-chip (620, 640) of the above type. The RFID-chip (620, 640) can be accommodated in the respective temples of the spectacles and are preferably cast therein. It is, however, also possible to apply the chip on the spectacle lens frame because of its small size. Preferably, the RFID-chip (620, 640) is enclosed by the spectacles frame.

Figure 6A:
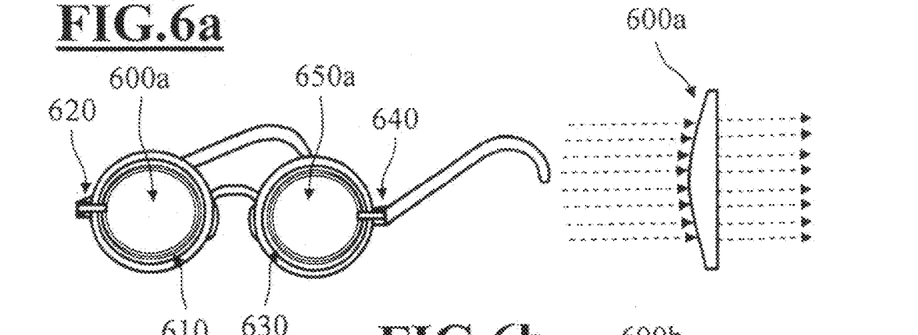
FIG. 6a shows the spectacles with lenses and antireflection coating.
Figure 6B:
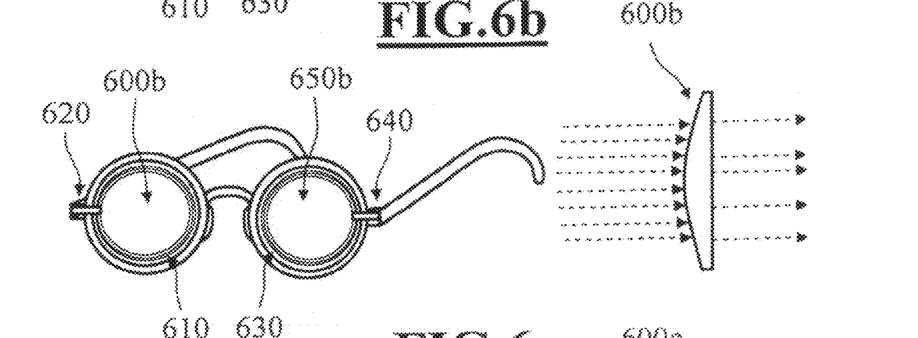
FIG. 6b shows the spectacles with lenses with the course of transmission.
Figure 6C:
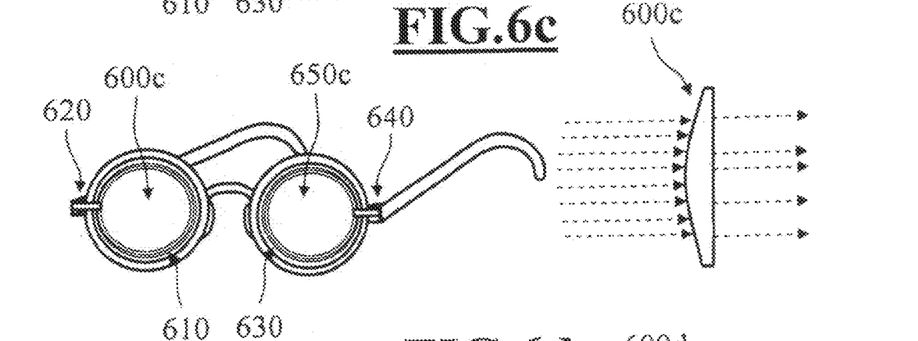
FIG. 6c shows the spectacles with lenses through colored (for example, sunglasses).
Figure 6D:
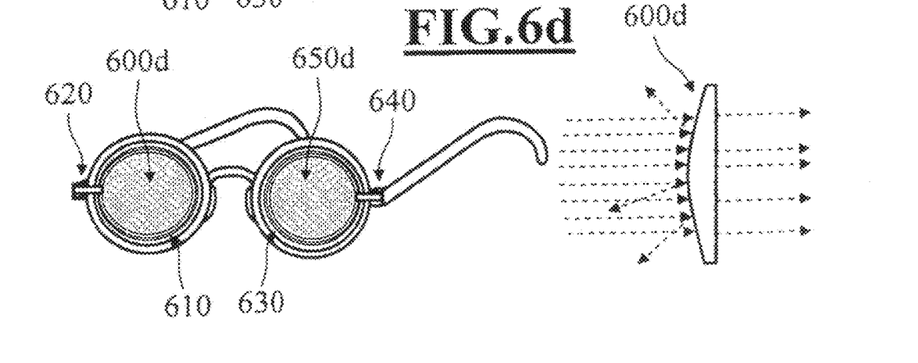
FIG. 6d shows the spectacles with lenses and a dielectric reflecting layer (for example, sunglasses cool blue)

The variations shown in FIGS. 6a to 6d differ from one another with respect to different transmission characteristics of the spectacle lenses. The variation in FIG. 6a shows spectacles having lenses and an anti-reflection coating and the variation of FIG. 6b shows spectacles having lenses with a transmission course. The variation of FIG. 6c shows spectacles having through-colored lenses as is conventional, for example, in sunglasses and the variation of FIG. 6d shows spectacles having lenses and a dielectric reflecting coating. The dielectric reflecting coating is, for example, provided in sunglasses to impart a special blue coloring (cool blue) to the sunglasses. The different transmission characteristics are shown in the drawing especially by the different shadings which are shown especially well in the side elevation views of the spectacle lenses (600a, 650a; 600b, 650b; 600c, 650c; 600d, 650d).

A transponder corresponding to the present invention can be utilized for monitoring in the production process or in the exit control. Even the wearer of spectacles can use the transponder in order to, for example, locate his spectacles and thereby find them again (this applies also to binoculars or the like).

The optician can, for example, directly read out spectacle-specific data without accessing his own data bank. Instruments for examining eyes, for example, can thereby already be preset to the last measurement values whereby the time expenditure for the refractionation can be significantly reduced. What is interesting here is that the spectacles or any other optical unit need not itself have its own current supply.

The RFID-coils have a great similarity to so-called diffractive optical elements (DOEs). For this reason, the optical and electronic requirements can be unified in a single structure.

Figure 7:
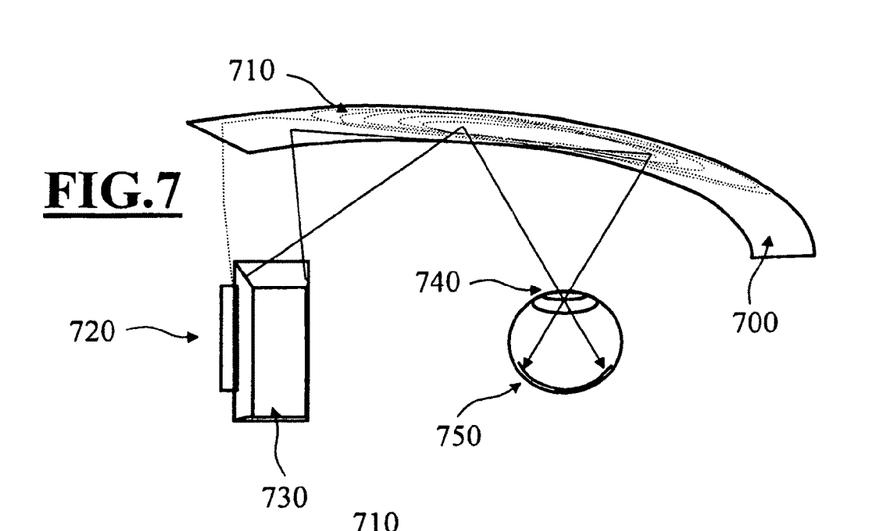
FIG. 7 is a schematic showing a so-called ST-HMD having an RFID-transponder according to the invention.
Figures 7A, 8:
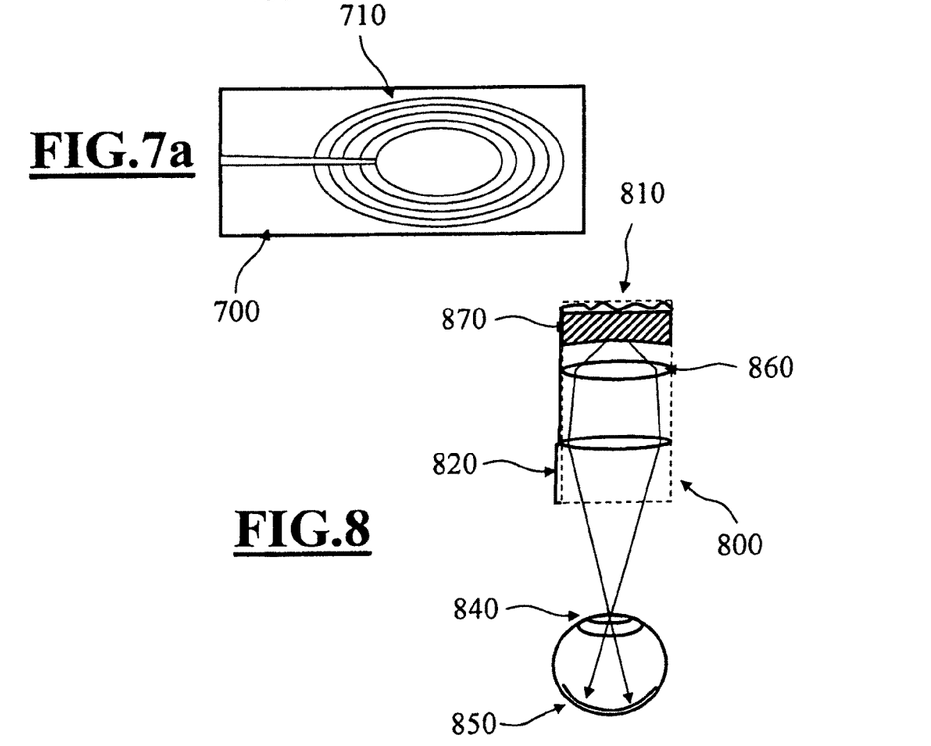

FIGS. 7, 7a and 8 show a so-called head mounted display (HMD). FIGS. 7 and 7a relate to a so-called ST-HMD (ST is an abbreviation for "see through"). FIG. 8 shows a so-called LA-HMD (LA is an abbreviation for "look around"). In the first variation, the viewer is represented by the eye with retina 750 and eye lens 740. The viewer can look through the display or more precisely through the reflection surface 700. In the second variation, a non-transparent transponder shield 800 is mounted forward of the eyes (retina 850, lens 840) of the viewer. The shield 800 comprises a liquid crystal display and an imaging optic (a lens 860 is shown by way of example).

According to the invention, a transparently-configured antenna (710, 810.) is applied to the reflection surface 700 of the ST-HMD or to the surface of the LCD 870 in the LA-HMD or this antenna is introduced into the display itself. The RFID-chip (720, 820) itself can be applied to the temple, on the display (730, 870) or on the housing of the imaging optic 860.

It is understood that the foregoing description is that of the preferred embodiments of the invention and that various changes and modifications may be made thereto without departing from the spirit and scope of the invention as defined in the appended claims.

What is claimed is:

1. An article comprising:
   a body defining an optical surface for performing an optical function or having an optical characteristic;
   an RFID-transponder having an antenna arranged on said optical surface;
   said antenna being optically transparent for visible light and being configured so as to be invisible to a user of the article; and,
   said body being a lens or a mirror.

2. The article of claim 1, wherein said antenna comprises a transparent, electrically conductive, coating.

3. The article of claim 2, wherein said antenna is a transparent, electrically conductive coating.

4. The article of claim 2, wherein said coating can be applied lithographically.

5. The article of claim 2, wherein said coating is an electrically conducting insulator or a semiconductor in dependence upon a doping thereof.

6. The article of claim 5, wherein said coating is a transparent conductive oxide (TCO).

7. The article of claim 2, wherein said coating comprises a transparent conductive oxide (TCO).

8. The article of claim 7, wherein said transparent conductive oxide (TCO) comprises at least one of the following: tin oxide ($SnO:F$; FTO, $SnO:Sb$; ATO); indium tin oxide ($In_2O_3$: Sn; ITO); zinc oxide ($Zno:Al$; AZO); cadmium stannate ($Cd_2SnO_4$, $Cd_2SnO_3$; CTO); cadmium oxide (Cdo); cadmium indium oxide ($CdInO_2$); copper aluminum oxide ($CuAlO_2$); and, silver antimony oxide ($AgSbO_3$).

9. The article of claim 8, wherein said optical characteristic is at least one of the following: absorption capacity; transparency; reflection capacity; refraction behavior; and, diffraction behavior of an incident ray in a predetermined spectral range.

10. The article of claim 1, wherein said article is one of the following: a magnifier; a camera objective; spectacles; an object carrier; or, a head mounted display.

11. A method for making an antenna of an RFID-transponder on the optical surface of an article, the method comprising the steps of:
    providing an item to be provided with said RFID-transponder and said item having a surface;
    applying a transparent, conductive coating to said surface; and,
    lithographically structuring said transparent, conductive coating to the shape of said antenna configured to be optically transparent for visible light and to be invisible to a user of the article; and,
    wherein said surface is defined by lens or a mirror.

12. An optical device comprising:
    a lens or mirror for performing an optical function and defining an optical surface;
    an RFID-transponder;
    an antenna having a predetermined shape and being connected to said transponder; and,
    said antenna being configured as a lithographically structured transparent conductive coating applied to said optical surface to have said shape and be optically transparent for visible light and to be invisible to a user of the optical device.

13. An optical device comprising;
    a lens or mirror for performing an optical function and defining an optical surface;
    an RFID-transponder;
    an antenna having a predetermined shape and being connected to said transponder;
    said antenna being configured as a lithographically structured transparent conductive coating applied to said optical surface to have said shape and being configured so as to be invisible to a user of the optical device; and
    said coating being a transparent conductive oxide (TCO).

* * * * *

UNITED STATES PATENT AND TRADEMARK OFFICE
CERTIFICATE OF CORRECTION

| | | |
|---|---|---|
| PATENT NO. | : 8,519,849 B2 | Page 1 of 1 |
| APPLICATION NO. | : 12/318875 | |
| DATED | : August 27, 2013 | |
| INVENTOR(S) | : Martin Ross-Messemer | |

It is certified that error appears in the above-identified patent and that said Letters Patent is hereby corrected as shown below:

<u>In the Specification</u>

<u>In Column 2</u>:
Line 18: delete "aim" and substitute -- arm -- therefor.

<u>In Column 6</u>:
Line 17: delete "layer-is." and substitute -- layer is -- therefor.

<u>In the Claims</u>

<u>In Column 7</u>:
Line 48: delete "conductive," and substitute -- conductive -- therefor.

<u>In Column 8</u>:
Line 8: delete "(Zno:Al; AZO)" and substitute -- (ZnO:Al; AZO) -- therefor.
Line 9: delete "(Cdo)" and substitute -- (CdO) -- therefor.

Signed and Sealed this
Twelfth Day of November, 2013

Teresa Stanek Rea
*Deputy Director of the United States Patent and Trademark Office*